US008364951B2

United States Patent
Peterka et al.

(10) Patent No.: US 8,364,951 B2
(45) Date of Patent: Jan. 29, 2013

(54) SYSTEM FOR DIGITAL RIGHTS MANAGEMENT USING DISTRIBUTED PROVISIONING AND AUTHENTICATION

(75) Inventors: Petr Peterka, San Diego, CA (US); Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1011 days.

(21) Appl. No.: 10/334,606

(22) Filed: Dec. 30, 2002

(65) Prior Publication Data

US 2004/0128499 A1   Jul. 1, 2004

(51) Int. Cl.
*H04L 9/00* (2006.01)

(52) U.S. Cl. .......... 713/155; 380/279; 380/46; 713/171; 713/168; 713/169; 713/170

(58) Field of Classification Search .................. 713/155; 705/65–69
See application file for complete search history.

(56) References Cited

U.S. PATENT DOCUMENTS

| | | | | |
|---|---|---|---|---|
| 5,535,276 | A | | 7/1996 | Ganesan |
| 5,544,322 | A | * | 8/1996 | Cheng et al. ................... 709/229 |
| 5,684,950 | A | * | 11/1997 | Dare et al. ....................... 726/10 |
| 6,009,175 | A | * | 12/1999 | Schanze ......................... 713/155 |
| 6,073,242 | A | | 6/2000 | Hardy et al. |
| 6,615,264 | B1 | * | 9/2003 | Stoltz et al. .................... 709/227 |
| 6,643,774 | B1 | * | 11/2003 | McGarvey ..................... 713/155 |
| 6,871,232 | B2 | * | 3/2005 | Curie et al. .................... 709/225 |
| 7,010,600 | B1 | * | 3/2006 | Prasad et al. .................. 709/225 |
| 7,043,456 | B2 | * | 5/2006 | Lindskog et al. ............... 705/76 |

(Continued)

FOREIGN PATENT DOCUMENTS

| | | |
|---|---|---|
| WO | WO 00/11849 A1 | 3/2000 |
| WO | WO 01/56249 A1 | 8/2001 |

(Continued)

OTHER PUBLICATIONS

William Stallings,Cryptographic and Network Security,Second edition,Published 1999 Pearson Education Inc,pp. 402-412.*

(Continued)

*Primary Examiner* — Fikremariam A Yalew
(74) *Attorney, Agent, or Firm* — Susan R. Payne

(57) ABSTRACT

A digital rights management system (DRM) for restricting and permitting content access in a digital content distribution network such as a network used to deliver television programming. The DRM uses distributed authentication and provisioning so that the potentially many different entities involved in the content distribution network can have localized management and control. Distributed authentication can use single or multiple instances of authentication services. A ticket granting service (TGS) is used to allow clients to request services. In one approach, multiple authentication services use a common key that is known to the TGS. In another approach, unique keys are provided to each authentication service and these keys are communicated to the TGS. Distributed provisioning allows different entities to grant access rights or other resources. Provisioning service (PS) processes can execute at multiple different physical locations. Synchronization among the different PSs is provided by a managing entity or in a peer-to-peer transfer to help ensure the uniqueness of user IDs. New clients can make an initialization request from a key management system via an appropriate protocol. The requests can be made from a single, dedicated authentication service, from an authentication service associated with a specific provisioning service, or from multiple authentication services in the network.

17 Claims, 2 Drawing Sheets

U.S. PATENT DOCUMENTS

| | | | |
|---|---|---|---|
| 7,103,784 B1 * | 9/2006 | Brown et al. | 726/9 |
| 7,206,765 B2 * | 4/2007 | Gilliam et al. | 705/51 |
| 2001/0035814 A1 | 11/2001 | Uchida | |
| 2002/0010798 A1 * | 1/2002 | Ben-Shaul et al. | 709/247 |
| 2003/0093694 A1 * | 5/2003 | Medvinsky et al. | 713/201 |
| 2003/0188193 A1 * | 10/2003 | Venkataramappa | 713/201 |
| 2004/0236659 A1 * | 11/2004 | Cazalet et al. | 705/37 |

FOREIGN PATENT DOCUMENTS

| | | |
|---|---|---|
| WO | WO 01/99374 A2 | 12/2001 |
| WO | WO 03/045036 A2 | 5/2003 |

OTHER PUBLICATIONS

Ganesan, Ravi; "Yaksha: Augmenting Kerberos with Public Key Cryptography"; *Proceedings of the Symposium on* San Diego, CA.; 1995, pp. 132-143, XP010134533.

Kohl, J., et al.; "The Kerberos Network Authentication Service (V5)"; *Network Working Group Request for Comments*, 1993 pp. 1-97 No. 1510, XP002929784.

EPC Supplementary Search Report, Re: Application #03800196.2-2413/1579624 PCT/US0341296; Jul. 13, 2011.

Neuman B.C., et al, "Kerberos: An Authentication Service for Computer Networks", IEEE Communications Magazine, vol. 32, No. 9; Sep. 1, 1994; pp. 33-38.

Menezes et al., "Handbook of Applied Cryptography", Washington D.C, CRC Press, 1997, ISBN 0-8493-8523-7, pp. 500 to 502 & pp. 570 to 572.

PCT International Search Report for PCT/US2003/41296, dated Sep. 15, 2004.

European Office Action for EP 03800196.2, dated Apr. 24, 2012.

Canadian Office Action for CA 2,509,206, dated Sep. 20, 2011.

* cited by examiner

SYSTEM FOR DIGITAL RIGHTS MANAGEMENT USING DISTRIBUTED PROVISIONING AND AUTHENTICATION

CROSS-REFERENCE TO RELATED APPLICATIONS

This application is related to the U.S. Pat. No. 7,356,687 granted on Apr. 8, 2008 entitled "ASSOCIATION OF SECURITY PARAMETERS FOR A COLLECTION OF RELATED STREAMING PROTOCOLS"; U.S. Pat. No. 7,243,366 granted on Jul. 10, 2007 entitled " KEY MANAGEMENT PROTOCOL & AUTHENTICATION SYSTEM FOR SECURE INTERNET PROTOCOL RIGHTS MANAGEMENT ARCHITECTURE"; which are hereby incorporated by reference into this application for all purposes as if set forth in full.

BACKGROUND OF THE INVENTION

This invention is related in general to digital rights management and more specifically to a system using a distributed approach to provide authentication, provisioning, access, authorization and other aspects of digital rights management in a widespread distribution system such as digital cable television.

Digital rights management (DRM) systems attempt to ensure that content creators, publishers, distributors and other commercial handlers of content can restrict access and control delivery and presentation of content. A DRM system also helps ensure that viewers, or users, of the content receive what they expect to receive, i.e., that for which they have paid, subscribed or licensed. However, difficulties arise when trying to implement efficient DRM in a huge, multi-user, multi-provider, system that includes many entities desiring to act without centralized restrictions. Such a system is found, for example, in a digital cable television network. Such a network may have dozens of content providers, hundreds and thousands of distribution entities, and millions of end users.

One traditional approach to authentication and access of services (or content) via a digital network is Kerberos. Kerberos is an authentication service developed by the Massachusetts Institute of Technology. Information on Kerberos can be found in RFC 1510 and at other sources, e.g., at http://nii.isi.edu/publications/kerberos-neuman-tso.html, or at http://nii.isi.edu/info/kerberos/. Kerberos uses an authentication server to generate session keys so that a user who requests access to content from another supplier (e.g., a server computer) is provided with a session key and ticket. The user sends the session key and ticket to the server computer so that the desired content (or service) can be obtained.

An approach with a single centralized Kerberos-based Authentication Server and a single centralized Provisioning Server works well for small networks (e.g., campus or corporate local area networks (LANs)) but it is not suitable for a very large network where access grants must come from multiple entities. For example, in a digital cable television network localized distribution occurs at headends, secondary headends, primary nodes and other nodes. Operators at the headends and nodes may have a need to grant or revoke access, change access rights, etc., without going to a central authority. Other entities involved in the system such as broadband operators and content providers may also desire such abilities.

Also, different subscription programs may require different provisioning. For example, cable service providers offer subscriptions that include different content and channels that vary among different physical geographic areas, logical viewer groupings, etc. These subscription programs can change with respect to other programs as, for example, where a local sporting event is blacked out in the city hosting the event. Subscribers may bundle different programs and channels into a given package subscription, etc. Thus, any DRM system must be able to be localized for certain purposes and must be able to handle different access and provisioning rules.

Although the Kerberos architecture provides a general mechanism, called realms, for handling distributed authentication, this mechanism does not adequately address, or improve upon, the deficiencies noted herein for Digital Rights Management systems.

Thus, it is desirable to provide a system that improves upon shortcomings in the prior art.

BRIEF SUMMARY OF THE INVENTION

A digital rights management system (DRM) for restricting and permitting content access in a content network such as a network used to deliver television programming. The DRM uses distributed authentication and provisioning so that the potentially many different entities involved in the content network can have localized management and control.

Distributed authentication can use single or multiple instances of ESBroker authentication realms. Each authentication realm may be operated by a separate business entity (e.g., a content provider) and may include one or more Authentication Servers (AS) and a (possibly distributed) Provisioning Servers (PS) that share the same subscriber database. There may also be one or more service realms that are associated with various content delivery services, such as caching servers and DRM license servers. Within each service realm there may be one or more ticket granting services (TGSs) that issue tickets to clients, where the tickets allow access to services within a particular realm. In general, the same realm could be both an authentication realm and a service realm at the same time and thus can at the same time include authentication servers, provisioning servers and TGSs.

After authenticating a client, an authentication server normally issues a TGT (ticket granting ticket) that can further authenticate that client to a TGS. An authentication server and a TGS may in general belong to two different realms. In such cases, inter-realm keys are shared between the two realms. A TGT is encrypted and authenticated using an inter-realm key that is known to both the authentication and service realms. This allows for a TGT to be created in an authentication realm and be validated and decrypted in a separate service realm.f Distributed Entitlement Service (ES) allows different entities to grant access rights or other resources. ES processes can execute at multiple different physical locations belonging to different business entities. An authentication service may need to access multiple ESs in order to obtain authorization data for different subscribers. In this case, subscriber principal names need to be synchronized between an authentication service and multiple ESs and must be unique within the same realm.

Alternatively, there may be a single ES managing a single subscriber database within each authentication realm. In that case, each authentication service always requests subscriber authorization data from the same ES. Synchronization of subscriber principal names is only required between the authentication server and ES that belong to the same realm.

In alternative embodiments, each ES can assign different authorization data to different clients. For example, if a user provisions with a first content provider, such as Disney, that user can receive subscription services for Disney-related content. When the user provisions with ESPN the user receives subscription services for ESPN-administered content such as different program channels (e.g., ESPN-1, ESPN-2). The authorization data can be included in a TGT and then transferred to a service ticket issued by the TGS.

The system allows access rules having static and dynamic dependencies to be combined from different sources. Distributed authorization is provided whereby local entities, such as content providers or broadband operators, can perform authorization as well as authentication. An entity may use their managed authentication portal to perform initial provisioning and to run an authentication service. Client, or user, data can be shared with TGSs in other realms by encoding it into a ticket-granting-ticket (TGT). Other features are provided.

In one embodiment the invention provides a method for providing access rights to content in a digital distribution system, the system including a provisioning service for allocating rights to a subscriber and an authentication service for verifying the identity of a DRM client application, the method comprising operating a ticket granting service belonging to a first realm; operating a first authentication service, first provisioning service and first entitlement service belonging to a second realm; operating a second authentication service, second provisioning service and second entitlement service belonging to a third realm; and provisioning each authentication service with a key that is also known to the ticket granting service.

In another embodiment the invention provides a digital content distribution system comprising a first plurality of realms for providing authentication services; and a second plurality of entities for providing provisioning and entitlement services, where an authentication service within a single realm obtains subscriber authorization data from a plurality of entitlement services.

In another embodiment the invention provides a plurality of realms comprising of ticket granting services, where each authentication service shares a different key with each ticket granting service realm.

DETAILED DESCRIPTION OF THE INVENTION

Figure 1:
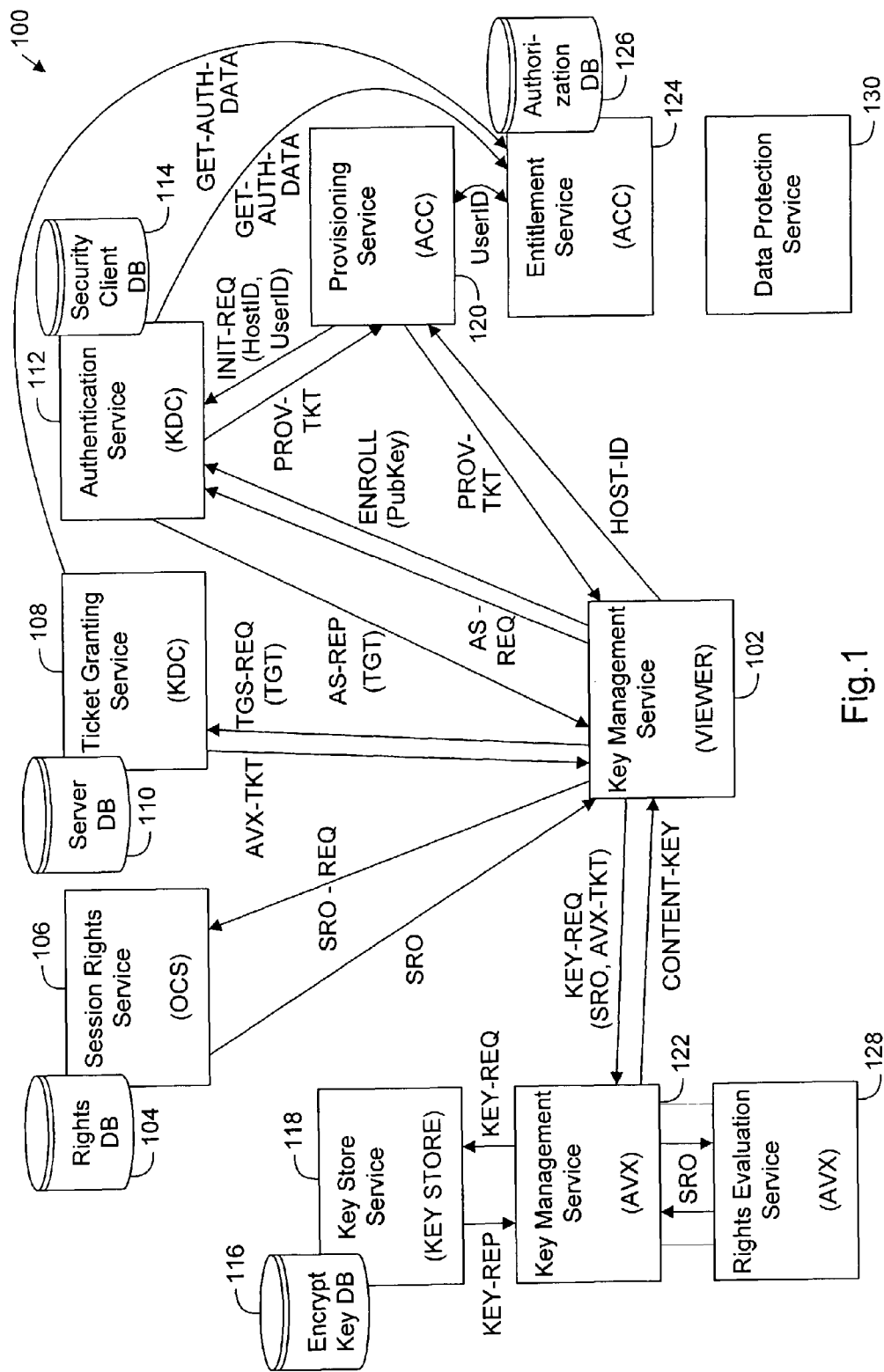
FIG. 1 shows logical components of a system of the present invention.

FIG. 1 shows logical components in a preferred embodiment of the system of the present invention.

In FIG. 1, logical components are shown in boxes with an indication of the physical component that is, preferably, used to perform the functionality of the logical component in parenthesis. Note that FIG. 1 is merely a broad, general diagram of a preferred embodiment of the invention. The functionality represented by logical components can vary from that shown in FIG. 1 and still remain within the scope of the invention. Logical components can be added, modified or removed from those shown in FIG. 1. The physical components are examples of where logical components described in the diagram could be deployed.

In general, the functionality of the present invention can be performed in hardware, software or a combination of both. Multiple processors can be used in parallel, concurrent, distributed, etc. types of processing. A preferred embodiment, discussed below, uses the Internet and other digital networks. Geographical location, control, management or other aspects of logical components can vary from those geographical, or physical locations discussed herein. An example of a physical system can be found in the related co-pending patent application cited, above.

FIG. 1 shows interfaces in an Internet Protocol Rights Management (IPRM) system designed for secure content distribution and for the enforcement of rights of content and service providers. Such a system is used, for example, with satellite and cable television distribution channels where standard television content, along with digital information such as files, web pages, streaming media, etc., can be provided to an end user at home via a set-top box. IPRM system 100 is illustrated using a few exemplary logical components. In an actual system, there will be many more instances of specific logical components. For example, key management service 102 is intended to execute at a user, or viewer location. Naturally, there will be millions of viewers in a typical cable television network.

Provisioning service (PS) 120 accepts new customers into the IPRM system. A new customer (i.e., viewer or user) is identified by accepting identification information such as name, address, credit card account, etc. information. The new customers provide their host ID (based on the client hardware configuration) to the provisioning service 120. Typically, a new customer is given a unique ID to use as their login name.

Provisioning service 120 sends an initiation request to authentication service (AS) 112 to register a new IPRM client and receives a provisioning ticket in response. The provisioning ticket is sent to the customer's processing system (e.g., set-top box) for later use in attaining services through the authentication service. The customer's processing system also uses the provisioning ticket and other parameters returned by the provisioning service (e.g., host name of the authentication service) to configure itself.

The customer's processing system, also referred to as the "client" system, uses the provisioning ticket to initially register its public key with the authentication service. Provisioning service 120 shares the new client's user ID (also referred to as the client principal name) with other entities in the IPRM system. Importantly, the provisioning service shares the new client information with entitlement service 124.

The invention uses distributed provisioning so that different entities can perform provisioning somewhat independently of each other. User IDs must be made unique within a single realm, which is normally enforced by the authentication service. When one of the multiple provisioning services within the same realm attempts to initialize a client with a duplicate user ID, this request will be rejected by the authentication service. In one mode of operation, the PS performs an initialization request to provision a new client via a single, dedicated, AS. Alternatively, a single AS that is associated with the requesting PS can be accessed. Combinations of these two approaches can also be used, e.g., there can be multiple authentication services belonging to multiple realms and within each realm there can be multiple provisioning services that interface with the same authentication service. It is likely that a large distribution system would allow provisioning entities to perform localized authentication and entitlements.

Note that although provisioning and authentication are distributed, they can also be controlled centrally by a single company entity. In FIG. 1, this entity is indicated as Authenticating Central Company (ACC). The ACC can assign a principal name to each client system and/or to each of potentially multiple users at a given client system. The principal name is used by the PS and any authentication service when the client (or user) is processed by the ACC.

A preferred embodiment of the invention uses Secure Socket Layer (SSL) between the client system and a provisioning service during one or more of the initial provisioning steps described above. However, other approaches can use any type of secure communication protocols or other ways of protecting communications.

User authentication can be provided by the ACC, content providers, operators of portions of the cable or broadband system (e.g., multiple systems operators (MSOs), broadband operators (BBOs), etc.), or a combination of these entities. In order to achieve this, the IPRM is logically subdivided into multiple administrative domains, or realms. A separate authentication realm can include its own AS and one or more provisioning and entitlement services. The AS can be distributed. A service realm can include one or more ticket granting services and multiple content delivery services such as caching servers and license servers. In general, the same realm could serve as both an authentication and a service realm and thus could contain services of all of the above listed types. In order to achieve this functionality, a KDC is logically split into an authentication service and a ticket granting service. Both authentication and ticket granting services may still be packaged into a single KDC application-even though in some cases it will be utilized only as an authentication service or only as a ticket granting service. Different approaches can use a single instance of an AS at the ACC, multiple instances at different content providers and in different realms, multiple instances at different operator sites, or a combination of these approaches.

If multiple authentication services are installed in different realms then each of these services can be provisioned with a key that is also known to the TGS that belongs to a separate service realm. This key could be the same for each authentication service, although the preferred approach is to have a unique key assigned to each pair of authentication and service realms. This shared key is known as an inter-realm key and allows an authentication service in one realm to issue a ticket granting ticket (TGT) that can be decrypted and validated by a TGS in another realm. This TGT allows an IPRM client to obtain caching server and other types of tickets from a TGS that is in a realm that is different from the client's authentication realm. The provisioning server can provide new Client IDs and Host IDs to appropriate authentication servers, in order to allow users to be authenticated by a specific AS. Thus, distributed authentication can be achieved.

Once a client has received a provisioning ticket and other configuration parameters, and after the new client's user ID has been provided to entitlement services, the Authentication Service (AS) can be invoked to authenticate the client so that they are trusted within the IRPM system. A key management service executing on the client's processing system generates a public-private key pair. Next, the client system uses the provisioning ticket received from provisioning service 120 to send the public key to authentication service 112. Authentication service 112 stores the public key and associates it with the viewer, e.g., by using the viewer's associated user ID. The client system then uses it's private key to send the request to the authentication service to request a Ticket Granting Ticket (TGT). The TGT is used as a token of trust to obtain additional tickets from ticket granting service 108. For example, an approach as used in the well-known Kerberos network authentication protocol can be used. More information on Kerberos can be found in RFC 1510 at, e.g., http://www.ietf.org/rfc/rfc1510.txt The authentication service may also include inside the TGT authorization data obtained from entitlement service 124 that can indicate permissions, or restrictions, based on a specific customer's rights.

The authentication service maintains a database of client records including the client principal name, Host Identifier and client Public Key. User name, address, phone number, and other information can be kept by the provisioning system. A client is identified by a principal name. When a client is a subscriber, principal name and subscriber ID (or user ID) can be the same, but, in general, a principal name is more generic and can identify other clients and servers that are not subscribers.

Entitlement Service (ES) 124 is used to assign capabilities and authorization data to new or existing customers. This information is used to evaluate content access rules against authorization data associated with a customer or customer client system. The ES shares the relevant information with the provisioning service. Normally, this information with any associated updates is obtained by the provisioning service from the viewer. This user entitlement information is associated with the IPRM client principal name that was created by the provisioning service during the initial viewer provisioning step. The ES makes this information available to the authentication service or ticket granting service (TGS) for inclusion in tickets, as desired, to maintain security. This entitlement information maintained by ES is preferably encoded in an Extended Markup Language (XML) format when provided to the AS or TGS. For example, customer entitlements can be based on payment scheme, promotional programs, geographic area, etc.

A single centralized ES (e.g., at the ACC) can be used, or multiple independent ESs run by content providers, broadband operators, or other entities, can be used. When a client requests a server ticket from TGS, the client may indicate which set of Authorization Data is needed (by specifying an ES host name). Alternatively, a client may provide the name of ES to an authentication service and obtain a TGT that already includes authorization data. The authorization data is copied by the TGS from the TGT into a server ticket, such as a cache server (e.g., AVX) ticket. The latter approach may be more efficient if accessing of authorization data is time-consuming or processing intensive, and if AS-REQs (see Table I, below, for a description of messages) are performed less frequently than TGS-REQs. One drawback of this latter approach is that client authorizations may not be revoked quickly so clients will be able to obtain content until their TGT expires. In either case, each client is able to cache sets of TGTs or server tickets.

The TGS may also combine subscriber entitlements (obtained either as Authorization Data from the TGT or directly from a given ES) with additional content usage rules that are not associated with an individual user. These additional rules may be associated with the user's MSO or BBO, which can be determined based on the user's IP address and may be obtained by the TGS using a direct connection to an MSO or BBO. In a preferred embodiment the ES maintains per-client authorization data. For non-per-client information the TGS obtains the information through an interface to an MSO or BBO.

Alternatively, instead of the client specifying an ES in an AS or TGS Request, there may be a single ES configured for each authentication realm and thus an AS would know the location of an ES based on the realm configuration data and would always insert client entitlements into a TGT.

If a Content Provider has its own AS and ES services, and if it receives from a client its ticket and authenticator, similar to what is provided by a Key Request ESBroker message, the Content Provider may then perform most of the authorization checks locally before issuing an SRO. In such a case the tickets can carry minimal (or no) authorization information.

Ticket granting service (TGS) 108 issues tickets to clients to authenticate the client to a server, and to allow the client to communicate with, and receive content (or other information) from a server. For example, a particular server such as an Audio-Video Exchange (AVX) server uses a session key provided in a ticket to return a subkey in a Key Reply message to a client. The subkey is then used by the client to derive keys needed to decrypt and authenticate the content received from the AVX. The TGS obtains a TGT from a client with a Request For A Server Ticket (TGS-REQ). The TGS copies authorization data from the TGT into a new server ticket. If authorization data is absent, such data is requested from the ES. The server ticket and TGS Reply (TGS-REP) are constructed so that only the requestor and server share the secret session key. See, e.g., the Kerberos protocol. The TGS maintains a database of servers 110 and their associated secret keys. Within the IPRM system different entities such as viewers, session rights service, etc., may request tickets from TGS.

An AS can encode a client's HostID in a TGT so that the TGS does not need to maintain a database of user information such as HostIDs. Preferably, the Host ID is encrypted along with the client principal name, authorization and other personal information.

The AS and TGS services can be co-located in a key distribution center (KDC). Entitlements are assigned by the ACC and are accessible to the KDC. A ticket-granting ticket has a relatively long lifetime (e.g., 30 days). The server ticket has a lifetime of several days and is cached by a client so that it can be reused when communicating with a same server multiple times. Typically, Session Rights Object (SRO) and key management request operations are performed for each streaming session.

The Session Rights Service (SRS) 106 is used to construct an SRO and sign the object so that only the server participating in the session transfer can authenticate the SRO. A viewer requesting the SRO provides a Secure Session ID (SSID) to the SRS 106 and identifies the desired content. The SRS 106 retrieves the content access rights for the content and encodes this information together with the user selection (e.g., purchase option) into an SRO. The SRS 106 signs the SRO and returns the SRO together with a ticket for a server that will enforce access rules.

The SRS 106 contains a database 104 of access rules for each piece of content it offers. For additional user privacy (to keep content requests private), the SRO may be transported over in secure channels such as via SSL (Secure Socket Layer) or TLS (Transport Layer Security) or using an IPRM security wrapper over HTTP (Hypertext Transfer Protocol). The SRS may communicate with other entities to create the final SRO. The preferred embodiment allows combining rules created by multiple entities. For example, a content provider may have content related rules based on how long content has been available (i.e., "new releases"). A central company that is managing the network may have rules based on subscription payments, broadband operator contracts, etc. These rules can be combined so that operators or subscribers obtain access to content if their payment rate is over a certain threshold and the content is within a category of release time. Any other types of rules can be used.

Rules can be dynamic or static with respect to the frequency of changes. For instance, a movie name does not usually change over time. On the other hand, the price to view a movie does change over time. Rules can include other factors or characteristics, as desired. Such factors or characteristics can be combined in relational ways, as is known in the art, to create the rules.

Rights Evaluation Service (RES) 128 is used to evaluate the SRO against a client's authorization data. When a server receives a key request containing an SRO, the server compares the rules and user selection encoded in the SRO with authorization data provided by the requestor in the server ticket. The RES allows the content to be streamed only if all rules are satisfied. Other embodiments need not be so stringent and may provide partial viewing of content based on partial satisfaction of rules, or rule portions. The RES may also store SRO and other relevant information for billing purposes. This function is primarily performed by caching servers when a caching server receives a request to stream a piece of content to a viewer. Examples of configuration and operation of caching servers within a system are shown in the co-pending patent application referenced, above.

Key Management Service (KMS) 122 is used to negotiate a set of unique content encryption keys for a given streaming session. The initiator (client) of a key request provides the server's ticket and SSID or possibly including other information such as an SRO in order to authenticate itself and negotiate a set of keys. The recipient server of the key request verifies the ticket, and if valid, sends a key reply with a content encryption key seed (subkey) that is used by both entities in derivations of the content encryption and signing keys.

The server KMS may also contact an RES to process the attached SRO as well as the authorization data from the server ticket. The server KMS also verifies that the requested content matches that indicated in the SRO. In a preferred embodiment, the key management service function is usually performed between a viewer and caching server, between a content provider and Key Store Service 118, and between a caching server and key store service.

A main function of Key Store Service (KSS) 118 is assign and store keys used to pre-encrypt content off-line. When the KSS receives a key request with a "store" action (e.g., from a pre-encryptor), it evaluates the request and assigns an encryption key for the specified content. The KSS stores the new key identified by the provided content ID.

The KSS sends the key back to the requestor in a key reply message. When the KSS receives a key request with a "retrieve" function (from a caching server), KSS retrieves the encryption key for the specified content. The KSS sends the key back to the requestor in the key reply message. The KSS maintains database 116 of pre-encryption keys identified by unique key IDs (e.g., content ID).

Data Protection Service (DPS) 130 is used to protect arbitrary sets of data without establishing a secure session the way the KMS does. Protection under DPS can be in the form of signing, encryption, or a combination of both. The DPS service has two main functions. A first function is to take an arbitrary set of data and an identity of a destination server, protect the data, and attach a ticket used to protect the data. In doing this, the KMS obtains a proper ticket for the destination server and uses a session key in the ticket to protect the data. A second function of DPS is to verify signatures of protected data and, optionally, decrypt the data using security keys from associated tickets. DPS can also return the identity of the originator.

The DPS service can be used to authenticate users to content providers, or to protect user selection data in order to deliver the data to the SRS. DPS is a generic service and does not need to be associated with any physical component of FIG. 1. DPS can be physically executed on the client system to generate authentication of user identities. DPS functions can be located on OCS to verify user identities. DPS functions can also be on the OCS to encrypt user selections, on the SRS to decrypt user selections, and can exist in other places of the physical system.

Entity portals can be protected by using encrypted data for communication with the portal. For example, hyper-text transport protocol (HTTP) can be encrypted using an HTTP proxy at the client side that is able to process IPRM security wrappers around HTTP messages. A user can also be authenticated to a portal using an IPRM-based authenticator that includes a ticket and some user-identifying information that is signed using a session key in that ticket. Where the portal is a web site, every page need not require user authentication for access. The client could provide a signed identity object using the Content Provider's Ticket instead of typing its name and password. This would make access to the portal much more user friendly because the ticket would be handed over transparently to the user activities. Preferably, SSL or TLS is first used to authenticate the web server and to secure all HTTP exchanges, including user authentication.

Instead of prompting a user for a username and password at a first visit to the portal, a similar mechanism could prompt the IPRM system to present a Service Ticket and use the ticket session key (or a subsequently generated unique key) to encrypt and/or authenticate the user identity. The server decrypts the user ID and sends it to the web server, which uses it in the same way as the original username/password.

A portal can map between an IPRM user ID and a user name known to the content provider (or other local entity associated with the portal) the first time this user signs in. Mapping can be provided by supplying the ticket and the corresponding IPRM ID as well as the content provider specific ID (e.g. user name). After that the mapping can be automatic, as, for example, where it is managed by the content provider.

The system provides support for multiple users, such as multiple users on a single household PC. In one approach, multiple TGT, one for each of the multiple users, is provided. A secondary identity can be used attached to a single TGT for all of the multiple users. In one scenario, the IPRM system maintains different users with one IPRM client (shared PC host, same Host ID, etc.) and requests a separate TGT and separate corresponding server tickets. Access to these tickets is protected by a local password. This solution is limited to the level of security of the local passwords. On the other hand, this is not intended to defend against piracy but rather against "cheating" within the household.

Example of a System with Distributed Authentication and Provisioning

The example presented here illustrates one way of how various content delivery and corresponding security services could be subdivided into different administrative domains (realms). Naturally, the logical functions in this example can be performed by many different arrangements and configurations of physical hardware.

Figure 2:
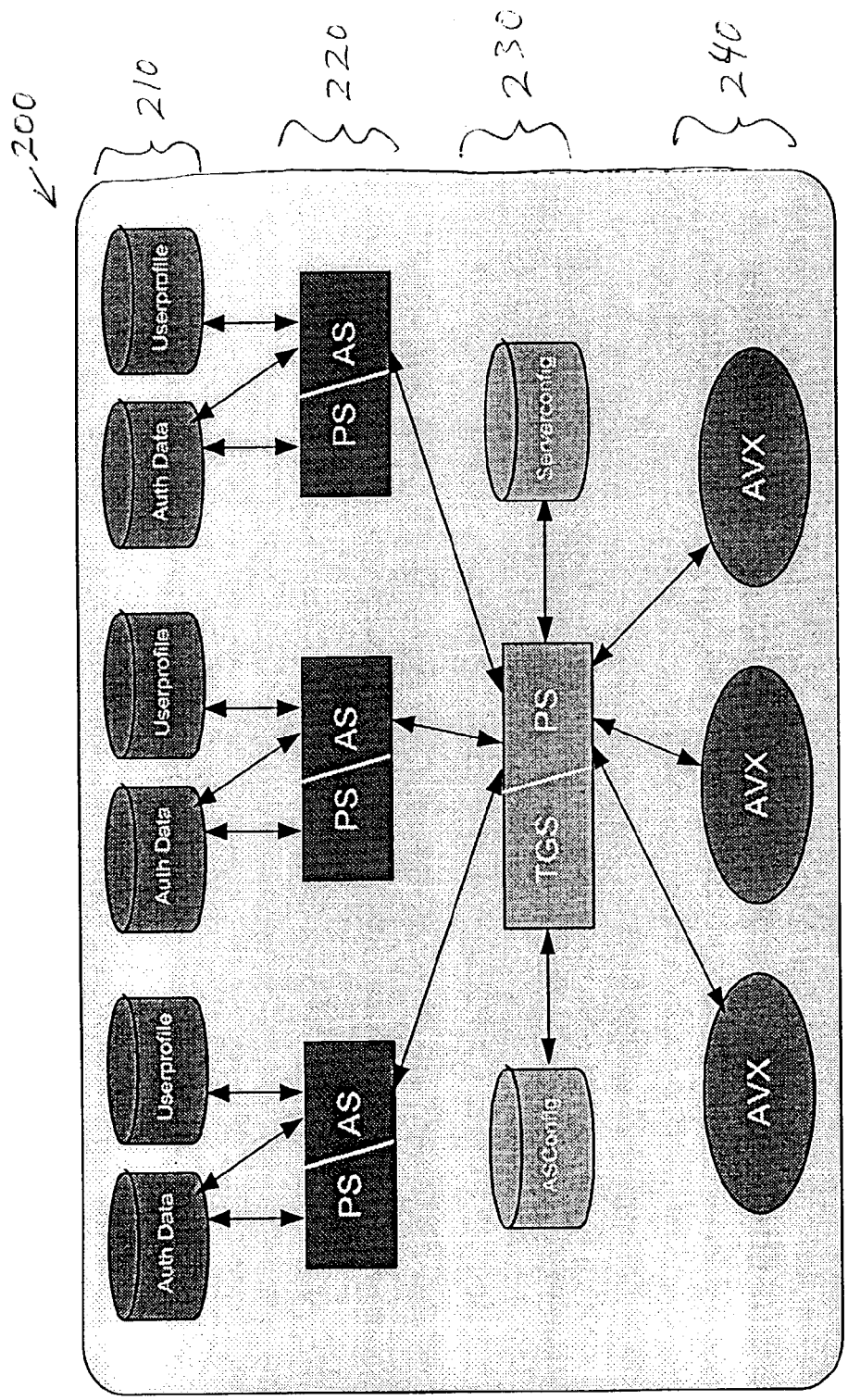
FIG. 2 shows simplified organization of physical components in a system suitable for executing functions of the logical components of FIG. 1.

FIG. 2 depicts a distributed key distribution center (KDC) architecture 200 in an IPRM (Internet protocol rights management) system suitable for implementing at least some of the logical components presented in FIG. 1

The distributed KDC architecture 200 includes a tier of data repositories 210 includes databases for, e.g., authorization data and user profiles. The user profile data includes information used to authenticate specific users, such as a user's public keys. Provisioning and authentication servers are shown at tier 220. FIG. 2 indicates that each pair of the logical processes to accomplish provisioning and authentication belong to a separate realm. Each such pair of processes can reside together, or can be executed in different locations. In general, any of the physical and logical components can exist at any physical location and can be executing at the same, or different times. One or more physical components can be used to execute functions of one or more processes. One or more processes can have functions executing on one or more physical components.

Tier 230 shows logical components associated with the administrative domain that controls AVXs (Caching Servers). This realm includes a ticket-granting service (TGS) that issues tickets to consumers that require authentication to one of the AVXs. This realm also includes a provisioning service needed to provision each AVX 240 that is added to this system.

In FIG. 2, users are provisioned with a Provisioning Server (PS) that could be associated with the administrative domain of a content provider such as Disney or ESPN. The user information is subsequently stored in the Userprofile table. Servers (the AVX's in tier 240) are all provisioned with a Provisioning Server in the same administrative domain, operated by a single business entity that provides the content caching service. The server information is subsequently stored in the Serverconfig table. The TGS within the content caching realm is provided with access to the AS-TGS keys, in order to be able to validate a TGT issued by an AS from another realm. ASConfig is a table that is used to store the AS-TGS keys.

Each AS authenticates users with the information retrieved from Userprofile and issues ticket granting tickets (TGT) to clients. Clients submit the TGT to TGS and request service tickets for an AVX. TGS first authenticates the TGT with data stored in ASConfig and then looks up Serverconfig to find the server key to issue a service ticket.

The client uses the service ticket to negotiate a content encryption key with AVX. During media streaming, AVX uses the content encryption key to encrypt the content and the client uses the same key to decrypt it.

In a preferred embodiment, KDC 200 generally functions to facilitate streaming of content in a secure fashion, to consumers. A content provider provides content only once and thereafter it can be moved among the caching servers. This improves the streaming performance and allows smaller content providers to sell their content without the need to buy expensive hardware for media streaming. It also allows introduction of an IP multicast (communication between a single sender and multiple receivers on a network) only at the caching servers. With current technology it is easier to have an IP multicast limited to a local access network than to have an IP multicast over the Internet.

The present invention in accordance with a first embodiment provides security to an IPRM system by using a KDC with distributed architecture. The IPRM agents in conjunction with KDC provide authentication, privacy, integrity and access control tools. For example, before a consumer can utilize the system for streaming content, a registration process is required. Secure registration for the consumer is provided by the IPRM. Thus, during the registration process, no one else may replicate the identity of a consumer by intercepting messages between the consumer and KDC components such as those shown in FIG. 2. The KDC is a trusted entity and provides key distribution to network components using a blend of symmetric and asymmetric algorithms.

KDC and IPRM components may be purely software protection, with a limited trust placed upon consumers, or may be hardware security modules, which may be mandatory to obtain rights to high quality content from copyright owners requiring high security levels, or may be a combination of both software and hardware. IPRM uses an authenticated key management protocol with high scalability to millions of consumers. In a preferred embodiment a key management protocol can include aspects of a product called ESBroker™ (Electronic Security Broker), a product of Motorola, Inc., San Diego Calif.

The key management protocol partly based on the Kerberos framework includes client interactions with the centralized Key Distribution Center (KDC 204) as well as with the individual application servers. A KDC client can send requests to the KDC. Within the IPRM system this includes consumers, caching servers and other IPRM system components. An application server includes any server registered with the KDC for which a client might request a service ticket (e.g. caching server, Billing Center, etc.). The same host may be both a KDC client and an application server at the same time. For the IPRM system 200, the protocol employs a series of messages to accomplish key management between client and server interfaces of the system. This key management protocol is intended to be of general use for establishing secure sessions and is not restricted to the IPRM system. These messages listed in Table I below, are further described in the co-pending patent application referenced, above.

under the control or management of associated one or more human, corporation or other organizational entities.

Although the TGS has been presented as a single entity, the TGS can be distributed across two or more locations with each one controlled by a different administrative domain (realm). In such an application, a different set of caching servers or other types of servers can be provisioned with different TGS servers. The client selects the corresponding TGS, or TGS server, to request a service ticket based on the administrative domain of the caching server.

Although the invention has been discussed in connection with a "digital rights management system" (DRM), any aspect of data security may benefit from the invention. For example, authentication, provisioning, and any other aspects may be applied with the present invention.

In general, the term "realms" can include one or more physical locations, processes, devices or other collection or combination of software and hardware. A realm can be subdivided into multiple physical locations. One or more servers from multiple realms can be co-located. A realm can also include hardware or software within a sphere of administrative control, or an "administrative domain,"—e.g., as where

TABLE I

| Code | Message Type | Description |
| --- | --- | --- |
| 1 | CLIENT_ENROLL_REQ | Client enrollment request, containing client public key and other attributes |
| 2 | CLIENT_ENROLL_REP | Client enrollment reply from KDC 204, possibly containing a client certificate for the public key. |
| 3 | AS_REQ | Request Ticket Granting Ticket from the Authentication Server |
| 4 | AS_REP | Reply from Authentication Server with the TGT |
| 5 | TGS_REQ | Request service ticket from TGS server 209 |
| 6 | TGS_REP | Reply from TGS server 209 with the service ticket |
| 7 | TKT_CHALLENGE | Server requests this client to initiate key management |
| 8 | KEY_REQ | Key Management request from client |
| 9 | KEY_REP | Key Management reply from the application server |
| 10 | SEC_ESTABLISHED | An ACK from client to an application server stating that security is established |
| 11 | ESB_ERR | Error reply message |
| 12 | INIT_PRINCIPAL_REQ | Create a Provisioning Ticket for a specified principal. If the specified principal doesn't already exist, it will be initialized in KDC 204 database. |
| 13 | INIT_PRINCIPAL_REP | Returns a Provisioning Ticket for the specified principal. |
| 14 | DELETE_PRINCIPAL_REQ | Delete a specified ESBroker ™ principal from KDC 204 database. |
| 15 | DELETE_PRINCIPAL_REP | Acknowledgment to DELETE_PRINCIPAL_REQ |
| 16 | SERVICE_KEY_REQ | Application server requests a new service key from KDC 204. |
| 17 | SERVICE_KEY_REP | KDC 204 returns a new service key to the application server. |
| 18 | AUTH_DATA_REQ | KDC 204 requests authorization data for a particular principal. This may be part or all of the authorization data that will appear in a ticket that KDC 204 subsequently issues. |
| 19 | AUTH_DATA_REP | Authorization Server returns the data requested with AUTH_DATA_REQ. |

Although the invention has been described with reference to specific embodiments, these embodiments are merely illustrative, and not restrictive, of the invention. For example, where a "portal" is discussed, any access to information associated with an entity is included. Such access can be via a web page, file transfer protocol, streaming media, television signal, telephone signal, etc. Where the term "entity" is used it can mean a human, corporation, or other organizational entity and their actions. Where the context of use of the term "entity" dictates that an apparatus be named, the term "entity" refers to any hardware (e.g., server, computer, etc.) that is servers within the same realm are under the same administrative control (and can share the same KDC database).

Thus, the scope of the invention is to be determined solely by the appended claims.

What is claimed is:

1. A method for providing access rights to content in a secure digital content distribution system, the system including a provisioning service for allocating rights to a human user to a Digital Rights Management (DRM) client application, including an entitlement service for assigning authorization data for digital content to the DRM client application and an authentication service for verifying the identity of the DRM client application, the method comprising:

operating a ticket granting service at a first administrative domain, the first administrative domain controlling access to content delivery servers;

operating a first authentication service at a second administrative domain, the second administrative domain controlling access, for the DRM client application associated with a first set of human users, to second administrative domain content, wherein the first administrative domain is different from the second administrative domain;

operating a second authentication service at a third administrative domain, the third administrative domain controlling access, for a second set of human users, to third administrative domain content, wherein the second set of users are different from the first set of users, wherein each of the administrative domains shares an inter-realm key with the ticket granting service and each of the authentication services issues a ticket granting ticket which enables the DRM client application to request service tickets from the ticket granting service and;

granting the service ticket to the DRM client application from the ticket granting service, the service ticket containing authentication data which enables the DRM client application to access second administrative domain content via, one of the content delivery servers, and third administrative domain content via one of the content delivery servers.

2. The method of claim 1, wherein the secure digital content distribution system includes one or more of the following entities: an authenticating central company, content providers, broadband operators; wherein each entity is associated with one or more physical locations, wherein the first, second and third locations are each at one of the administrative domains.

3. A secure digital content distribution system comprising:

a first plurality of entities for providing authentication services, the plurality of entities being located at different administrative domains at different locations each other and controlling access to content at their respective administrative domain;

a second plurality of entities for providing provisioning services based on information provided by one or more of the plurality of entities for providing authentication services;

wherein each of the administrative domains shares an inter-realm key with a ticket granting service and each of the authentication services is configured to grant a ticket granting ticket to a client which enables it to request service tickets from the ticket granting service;

the ticket granting service which is configured to grant the service ticket to the client, the service ticket containing authentication data which enables the client to access content at each of the administrative domains via each authentication service; and a session rights service which is configured to construct a session rights object (SRO), wherein the SRO includes at least one purchase option selected by the client, the client being a Digital Rights Management DRM client application associated with a user.

4. The secure digital content distribution system of claim 3, further comprising the session rights service process for restricting client access to content based on one or more rules.

5. The content distribution system of claim 4, wherein the rules are static.

6. The content distribution system of claim 4, wherein the rules are dynamic.

7. The content distribution system of claim 3, further comprising one or more entities for providing entitlement services to assign authorization data to a client.

8. The content distribution system of claim 7, wherein the authorization data is used by a rights evaluation service to grant or deny access to content.

9. The content distribution system of claim 7, wherein an entity for providing entitlement services is associated with a provisioning service.

10. The content distribution system of claim 7, wherein an entity for providing entitlement services is associated with an authentication service.

11. The content distribution system of claim 7, wherein a single, centralized entity for providing entitlement services is used.

12. The content distribution system of claim 7, wherein first and second entitlement services assign different authorization data to a client.

13. The content distribution system of claim 8, wherein the ticket-granting service contacts an entity for providing entitlement services to obtain authorization data.

14. The content distribution system of claim 3, wherein an entity includes a local entity, the content distribution system further comprising an authentication portal associated with the local entity; and a process for authenticating a client during initial provisioning.

15. The content distribution system of claim 9, wherein a local entity includes a content provider.

16. The content distribution system of claim 9, wherein a local entity includes a broadband operator.

17. The content distribution system of claim 3, wherein the authentication service produces the ticket granting ticket, the ticket granting ticket including a client host identification.

* * * * *